No. 681,829. Patented Sept. 3, 1901.
G. A. KROHN.
VALVE FOR PUMPING ENGINES.
(Application filed Nov. 1, 1900.)
(No Model.) 2 Sheets—Sheet 1.
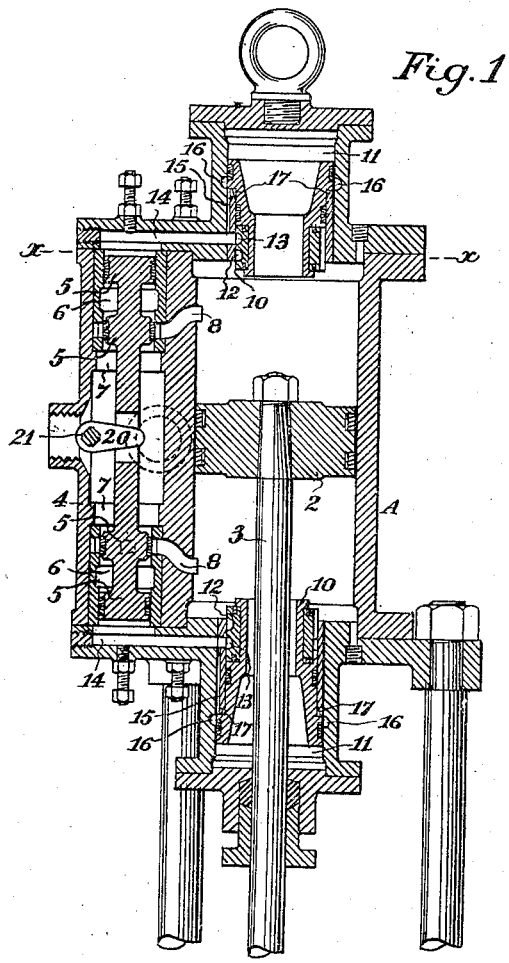
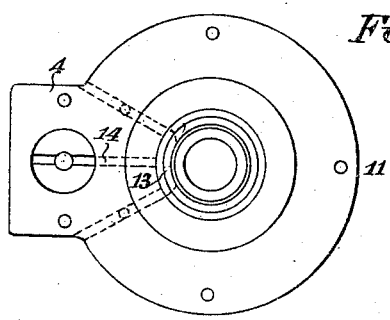

No. 681,829. Patented Sept. 3, 1901.
G. A. KROHN.
VALVE FOR PUMPING ENGINES.
(Application filed Nov. 1, 1900.)
(No Model.) 2 Sheets—Sheet 2.
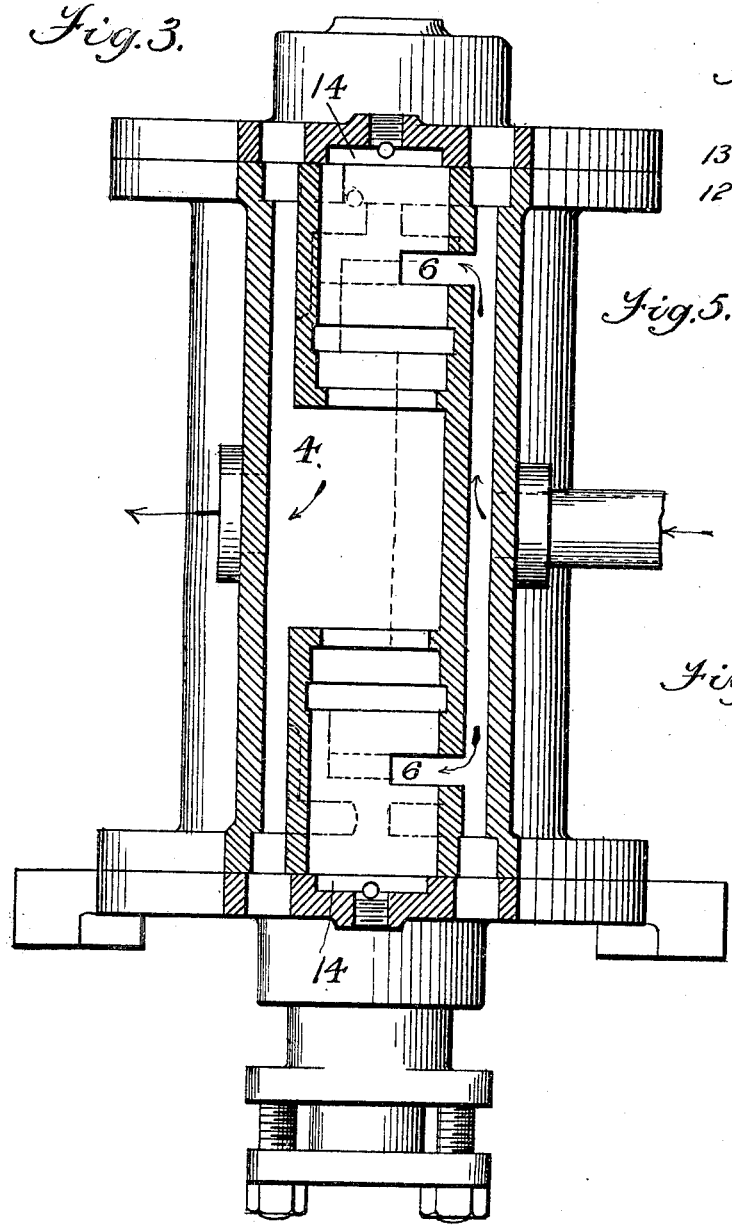
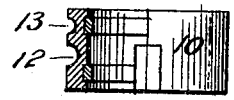
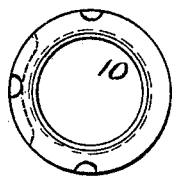
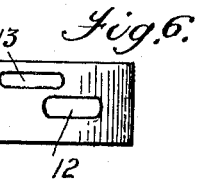
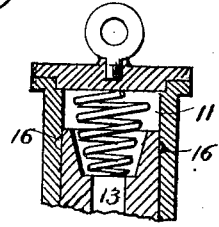
WITNESSES
INVENTOR
Gustave A. Krohn
by Dewey Strong & Co
his Attorneys

UNITED STATES PATENT OFFICE.

GUSTAVE A. KROHN, OF COARSEGOLD, CALIFORNIA, ASSIGNOR OF ONE-HALF TO E. H. COX, OF MADERA, CALIFORNIA.

VALVE FOR PUMPING-ENGINES.

SPECIFICATION forming part of Letters Patent No. 681,829, dated September 3, 1901.

Application filed November 1, 1900. Serial No. 35,115. (No model.)

*To all whom it may concern:*

Be it known that I, GUSTAVE A. KROHN, a citizen of the United States, residing at Coarsegold, county of Madera, State of California, have invented an Improvement in Valves for Pumping-Engines; and I hereby declare the following to be a full, clear, and exact description of the same.

My invention relates to an improved reciprocating engine which is especially designed to be connected with a pump by means of a piston-rod common to both engine and pump cylinders, the engine-piston being fixed to one end and the pump-piston to the other end of the cylinder.

My invention consists in details of construction whereby the admission and exhaust of the elastic medium under pressure is automatically effected and the position of the admission and exhaust valves changed at the completion of each reciprocation of the piston.

It also comprises details of construction which will be more fully explained by reference to the accompanying drawings, in which—

Figure 1 is a longitudinal section of my engine. Fig. 2 is an elevation of an end chamber on the line $x\,x$ of Fig. 1. Fig. 3 is an enlarged section of the valve-chamber, taken at right angles to Fig. 1 and showing the valve omitted. Fig. 4 is a part elevation and part section of one of the rings 10. Fig. 5 is a top plan of Fig. 4. Fig. 6 is a side elevation of Fig. 5. Fig. 7 is a detail to be referred to.

The cylinder A has a piston 2 reciprocating in it, and the piston-rod 3 extends out through one end with a suitable stuffing-box to prevent leakage at that point. The valve-chamber 4 contains a reciprocating valve, which consists of a stem having pistons 5 upon each end and so located with reference to the steam-ports 6 and the exhaust-ports 7 that when the valve is moved in one direction the steam-port at one end will be in open communication with the port 8, which leads to that end of the cylinder, and the other port 8 at the opposite end of the cylinder will be in open communication with the exhaust-port 7 at that end of the valve-chamber. The steam-ports communicate with the steam-inlet passage upon one side, and the exhaust-ports communicate with an exhaust-passage upon the opposite side of the valve-chamber 4, as shown in Figs. 2 and 3.

The means for reversing the position of the steam-valves consist of rings 10, which fit and are slidable axially in chambers 11, formed in the ends of the cylinder, and the rings project into the cylinder so far that when the piston arrives at either end of the cylinder it contacts with the ring at that end. These rings have annular grooves 12 and 13 made in their peripheries, and these grooves communicate, respectively, with the steam and exhaust passages of the engine. A passage 14 extends from each end of the valve-chamber to the periphery of the slidable ring, and by the movements of this ring either one or the other of the grooves 12 13 are brought into line with the passage 14. When the passage which connects with the steam-inlet is brought into line with the passage 14 at one end of the cylinder, steam will be admitted and passing through the passage 14 will act to force the piston-valve to the opposite end of its chamber. At the same time the passage 14 at that end communicates through the groove 13 with the exhaust-passage of the engine, so as to present no impediment to the movement of the valve. This movement of the valve opens communication between the steam-inlet 6 and port 8 at the end of the cylinder to which the piston is adjacent, and the opposite end of the cylinder is similarly placed in communication with the exhaust.

The rings 10 are forced inwardly into their chambers 11 by the contact of the piston arriving at either end of the cylinder. When, for instance, the piston arrives at one end of the cylinder, it presses the ring at that end back into this chamber, forcing the groove 13 out of line with the steam-passage 14 and at the same time bringing the groove 12, which is in communication with the steam-inlet, into line with the passage 14, thus admitting steam to move the main steam-valve into position where it will admit steam to that end of the cylinder, and the return movement of the piston 2 is commenced. As soon as this movement takes place and the ring 10 is released from pressure of the piston the ring is again forced outward, either by a spring contained within the chamber 11 or preferably by the direct action of the steam against the inner end of the ring, by reason of its superior pressure over the back pressure from the exhaust. This back pressure has its effect through a small groove or channel 15, made along the outer periphery of the ring and connecting with a groove 16 in the periphery of the chamber 11. A small annular cut is made around the periphery of the ring, as shown at 17, which reduces the area subjected to pressure at this point sufficiently less than that at the end of the ring which is open to the live-steam pressure, so that this live-steam pressure will force the ring forward into its normal position. Thus each of the rings is forced by the contact of the piston arriving at that end into position to admit steam to reverse the position of the main steam-valve and alternately admit steam to the ends of the main cylinder and to connect the piston end with the exhaust.

In starting the engine, or if at any time it is desired to operate it by hand, it is effected by a crank or cam arm 20, fixed upon a shaft 21, this shaft extending through a suitable stuffing-box out to one side of the valve-chamber, where a crank or lever arm may be connected with it to actuate it.

Having thus described my invention, what I claim as new, and desire to secure by Letters Patent, is—

1. In a reciprocating or pumping engine, the piston with its rod movable within the cylinder, a valve-chamber having inlet and exhaust ports, a piston-valve movable therein, ports in the cylinder which are connected alternately with the steam and exhaust passages of the engine by the movement of the valve, annular rings slidable in chambers at each end of the cylinder and normally projecting into the cylinder so that a piston will contact therewith, said rings having peripheral grooves, one of which connects with the exhaust and the other with a steam-inlet passage, and passages connecting the ring-chambers with the ends of the valve-chamber.

2. The combination in a reciprocating engine of a cylinder, a piston reciprocable therein, a valve-chamber and reciprocating valve whereby communication between steam and exhaust ports and opposite ends of the cylinder are alternately effected, annular rings slidable axially in chambers at the ends of the cylinder, and movable by contact of the piston therewith, grooves upon the peripheries of said rings, one of which grooves connects with the exhaust, and the other with the steam-inlet passages from the ring-chambers into the ends of the main-valve chamber whereby communication is made alternately with the exhaust, and steam-inlet passages to move the main valve.

3. In an engine having a reciprocating piston and piston-valve, rings slidable in chambers at opposite ends of the cylinder, and projecting so that the piston approaching either end will force the ring at that end into its chamber, passages connecting the ends of the main valve-chamber with the ring-chambers, grooves made in the periphery of the ring, one of which connects the valve-chamber with the exhaust-passage of the engine, and the other connects with the inlet-passage, the exhaust-groove connecting with the valve-chamber when the ring is in its normal position, and being cut off therefrom, and the inlet-groove connecting therewith when the ring has been forced into its chamber by the contact of the piston.

4. The combination with a reciprocating piston-engine and piston-valve for the admission and exhaust of the elastic medium, of chambers in the ends of the cylinder, passages leading therefrom to the ends of the valve-chamber, rings fitting and slidable in the cylinder-chambers having grooves on the periphery, one of which connects the end of the valve-chamber with the exhaust when the ring is in its normal position, and the other connects it with the steam-inlet when the ring has been depressed, and means for returning the rings to their normal position after the main piston-pressure thereon has been released.

5. The combination with a reciprocating piston-engine and piston-valve for the admission and exhaust of the elastic medium, of chambers in the ends of the cylinder, passages leading therefrom to the ends of the valve-chamber, rings fitting and slidable in the cylinder-chambers having grooves on the periphery, one of which connects the end of the valve-chamber with the exhaust when the ring is in its normal position and the other connects it with the steam-inlet when the ring has been depressed, secondary grooves within the ring-chambers and channels connecting said grooves with the exhaust whereby pressure is relieved upon one end of the ring while live-steam pressure is applied to again return the ring to its normal position.

In witness whereof I have hereunto set my hand.

GUSTAVE A. KROHN.

Witnesses:
ROBERT DUNCAN,
C. J. HOLZMUELLER.